Patented Jan. 15, 1946

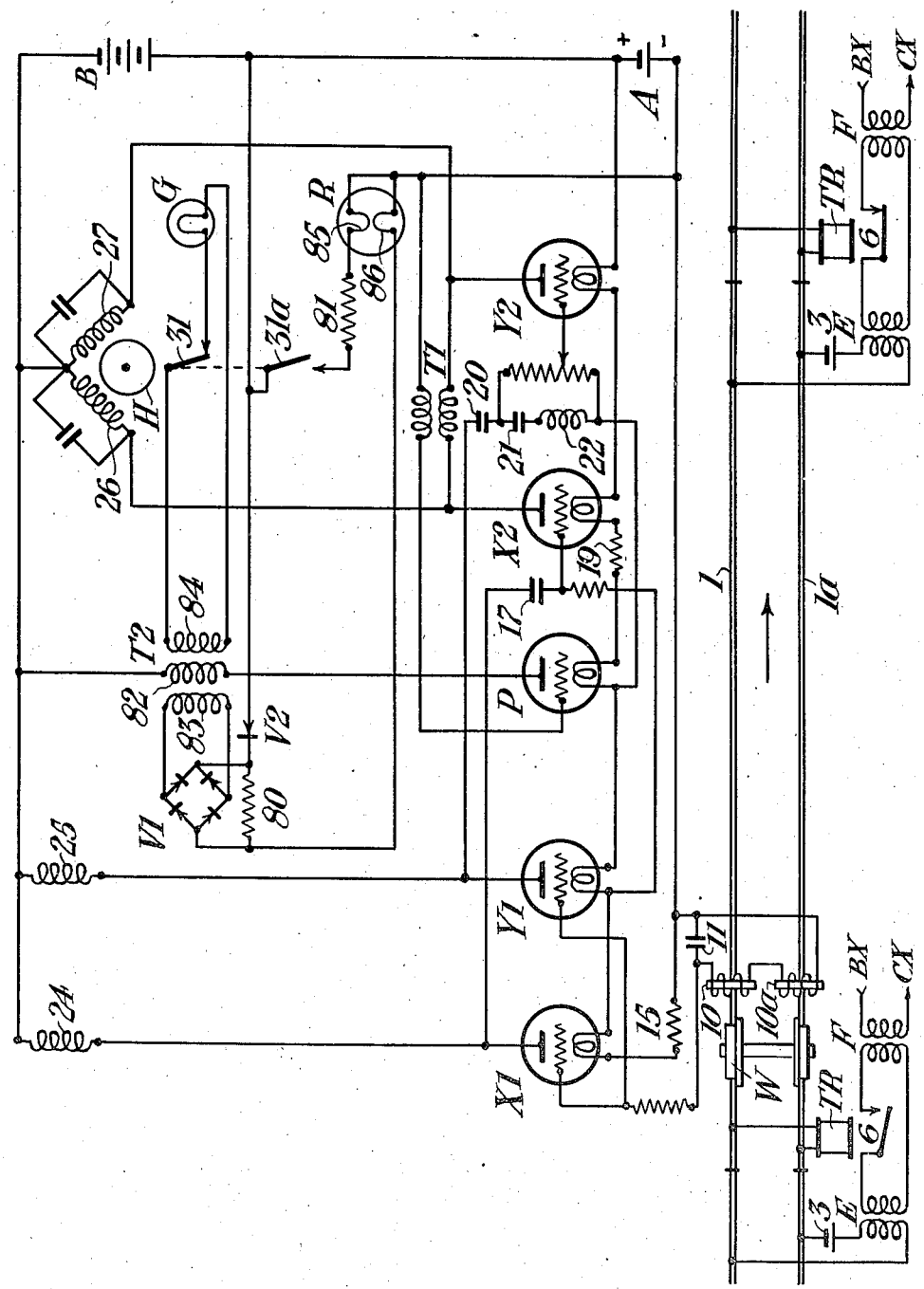

2,393,136

UNITED STATES PATENT OFFICE 2,393,136

RAILWAY TRAFFIC CONTROLLING APPARATUS

David C. Bettison, Omaha, Nebr.

Application December 1, 1944, Serial No. 566,097

7 Claims. (Cl. 246—63)

My invention relates to railway traffic controlling apparatus, and more particularly to cab signaling apparatus carried on a train and continuously responsive to alternating current in the track rails over which the train is running.

One object of my invention is to provide apparatus which is wholly electronic in character and without moving parts for controlling a visual cab signal.

Another object is the provision of means for use in a cab signal system employing a train control relay for the control of a cab signal and other train governing apparatus by which the operation of the relay is checked and the cab signal is controlled in the desired manner independently of the relay.

I shall describe one form of apparatus embodying my invention, and shall then point out the novel features thereof in claims.

In the accompanying drawing I have illustrated a typical cab signal system of a well-known type which is described in a booklet entitled "Bulletin No. 8, Automatic Train Control, Description of Continuous Inductive Train Control Systems," etc., published by the Committee on Automatic Train Control of the American Railway Association, Washington, D. C., January 1931. This system employs an electronic amplifier of the type shown in the Lewis Letters Patent of the United States No. 1,566,331, issued December 22, 1925, for governing a train control relay such as the relay H shown herein, which relay controls a two-indication visual cab signal comprising a green lamp G for indicating proceed and a red lamp R for indicating restrictive traffic conditions. In practice, the train control relay also controls an audible warning signal or train brake controlling devices, as described in the Bulletin referred to but these are not shown herein. The electronic amplifier of the abovementioned patent, as shown herein, has been modified in accordance with my invention by the provision of an additional amplifier tube P and auxiliary apparatus associated therewith for governing the indications displayed by the cab signal independently of the operation of the train control relay H by which the cab signal is normally governed. The electron tube P functions in such a manner that in the event the train control relay H should fail to release to extinguish lamp G in response to a change to a restrictive traffic condition, the current for energizing lamp G is cut off and the red lamp R is lighted by means independent of relay H.

In normal operation, the system functions as explained in the patent, as will now be briefly described.

In the drawing, the reference characters 1 and 1a designate the track rails of a railway along which traffic normally moves in the direction indicated by the arrow. The rails are divided into block sections each having the usual track battery 3 and a normally energized direct current track relay TR which is energized when the section is unoccupied. Each track relay TR supplies alternating current from a line transformer F connected to an alternating current source having the supply terminals BX and CX, over its front contact 6, and a track transformer E, to the track rails of the next block section in the rear. The train which carries the apparatus of my invention is indicated by the reference character W, the wheels and axles of which shunt the track circuit so that alternating current flows in the rails in the portion of the block in advance of the train provided this portion and the entire block next in advance, are unoccupied.

Two receiving coils 10 and 10a mounted on the train in advance of the forward wheels in the field of the current in the rails are energized inductively to produce a resonant voltage across the tuning condenser 11, which voltage is impressed upon the grid circuits of two electron tubes X1 and Y1, in parallel. The plate circuit of tube X1 is connected through a blocking condenser 17 to the grid of a second tube X2, the tubes X1 and X2 together constituting a two stage amplifier for energizing one winding 26 of the train control relay H, which relay is of the induction motor type. The electron tubes Y1 and Y2 constitute another two stage amplifier incorporating a phase-splitting device comprising a blocking condenser 21, a reactor 22 and a tuning condenser 20, which serves to energize the other winding 27 of relay H by current of substantially the same value as that supplied to winding 26 but differing in phase. The currents in the two windings coact to produce a rotating field, causing relay H to move its contacts 31 and 31a to the right to light the green lamp G and to extinguish the red lamp R in response to the presence of alternating current in the track rails in advance of the train.

The filaments of the four amplifier tubes X1, Y1, X2 and Y2 are connected in series, together with two limiting resistances 15 and 19 and the filament of the added tube P, across the terminals of a low voltage source of direct current indicated as a battery A. The grid circuit for each second stage tube is biased by connecting it to a point on the filament circuit which is at a negative potential with respect to the filament of the corresponding tube. These points are selected to correspond to the voltage received when the train first enters a long block and the track circuit current is a minimum. Loss of received energy due to grid circuit conductance occurs when the received voltage exceeds the bias value, and this loss serves to limit the output of the electron tubes to a substantially constant value even though a considerable increase in the track rail current occurs due to the shortening of the rail circuit as the train approaches the exit end of a block.

The plate circuits for the electron tubes are supplied with energy from a high voltage source of direct current, indicated as a battery B, the positive terminal of which is connected through reactors 24 and 25 to the plate circuits for tubes X1 and Y1, through the windings 26 and 27 of relay H to the plate circuits for tubes X2 and Y2, and through the primary winding 82 of a transformer T2 to the plate circuit for tube P.

The apparatus embodying my invention which I have added to the cab signal system includes the electron tube P, two transformers T1 and T2, two electronic rectifiers V1 and V2 of the copper oxide type or the like, and two resistors 80 and 81, while for the red lamp R one having two filaments 85 and 86 is used. When relay H is energized as above described, a relatively large potential difference exists across the lower terminals of its windings 26 and 27, since the upper terminals of the windings are connected together and the currents flowing therein are substantially in quadrature. Transformer T1 has its primary winding connected across the lower terminals of the windings 26 and 27 and is thus energized whenever relay H is energized, and its secondary winding supplies a voltage to the grid circuit for the electron tube P which is a measure of the energization of relay H, causing the tube P to modulate the battery current delivered thereto through transformer T2, and the secondary windings 83 and 84 thereof to deliver alternating current to rectifier V1, and also to lamp G, if contact 31 is closed, of a value which is in proportion to that supplied to relay H.

Since the secondary winding 84 is the only source of current for energizing lamp G, it follows that lamp G is lighted only when relay H is supplied with current of a predetermined value in response to the presence of alternating current in the track rails, irrespective of whether the closing of contact 31 of relay H is due to its energization or is due to a mechanical failure of the relay.

When relay H occupies its deenergized position in which contact 31 is open, its contact 31a is closed and connects the upper filament 85 of lamp R through resistor 81 across battery A, so that lamp R is lighted as will be readily apparent from the drawing.

The other filament 86 of lamp R is connected permanently across battery A, its circuit extending from the positive battery terminal through the rectifier V2, resistor 80 and filament 86 to the negative terminal of battery A. When the electron tube P is energized, the alternating current delivered by the secondary winding 83 of transformer T2 is converted by rectifier V1 to direct current which flows through resistor 80 and creates a potential difference across its terminals. The right-hand terminal of resistor 80 assumes a positive potential which exceeds the voltage impressed thereon by battery A, thereby blocking the flow of current from battery A through filament 86, and tending to reverse the current in the lamp circuit, but rectifier V2 blocks the flow of current from rectifier V1 through filament 86 and consequently filament 86 is dark when tube P is supplying current to lamp G and is energized only when tube P is deenergized.

It will be seen, therefore, that normally lamp G is lighted under clear traffic conditions, and lamp R is lighted, with both filaments energized, under restrictive traffic conditions. If relay H fails to open its contact 31 under restrictive traffic conditions, lamp G is extinguished and lamp R becomes lighted, due to the action of the electron tube P, and the relay failure is made manifest by the fact that filament 85 does not become energized along with filament 86. The apparatus of my invention therefore provides means for controlling a two indication cab signal comprising the lamps G and R without employing any moving parts, and the relay H may be omitted. On the other hand, relay H may be needed for the control of an audible signal or of brake controlling devices as already mentioned, in which case the apparatus of my invention serves to check its operation and to insure the display of the proper indications by the visual cab signal independently of the relay.

Although I have herein shown and described only one form of apparatus embodying my invention, it is understood that various changes and modifications may be made therein within the scope of the appended claims without departing from the spirit and scope of my invention.

Having thus described my invention, what I claim is:

1. In a railway cab signaling system, an electron tube amplifier responsive to alternating current in the track rails, a first cab signal lamp for displaying a proceed indication, electronic means for energizing said lamp by current delivered by said amplifier when alternating current is supplied to the track rails, a second cab signal lamp for displaying a restrictive indication, a circuit for energizing said second lamp comprising a permanent connection to a local source of direct current, and electronic means responsive to amplified alternating current derived from the track rails for impressing a direct current potential upon the circuit for said second lamp to block the flow of current therein as long as said first lamp is energized.

2. In a railway cab signaling system, an electron tube amplifier responsive to alternating current in the track rails, a first cab signal lamp for displaying a proceed indication, electronic means for energizing said lamp by current delivered by said amplifier when alternating current is supplied to the track rails, a second cab signal lamp for displaying a restrictive indication, a circuit for energizing said second lamp comprising a permanent connection to a local source of direct current, means including an electronic rectifier for deriving a direct current potential from the current delivered by said amplifier when alternating current is supplied to the track rails, and means for impressing said potential upon the circuit for said second lamp to block the flow of current therein as long as said first lamp is energized.

3. In a railway cab signaling system, an electron tube amplifier responsive to alternating current in the track rails, a first cab signal lamp for displaying a proceed indication, electronic means for energizing said lamp by current delivered by said amplifier when alternating current is supplied to the track rails, a second cab signal lamp for displaying a restrictive indication, a circuit for energizing said second lamp comprising a permanent connection to a local source of direct current, means including a first electronic rectifier for deriving a direct current potential from the current delivered by said amplifier when alternating current is supplied to the track rails, means for impressing said potential upon the circuit for said second lamp to block the flow of current therein from said local source as long as said first lamp is energized, and means comprising a second electronic rectifier included in the circuit for said second lamp for preventing the flow of current therein due to the potential impressed thereon by said first electronic rectifier.

4. In a railway cab signaling system, an electron tube amplifier responsive to alternating current in the track rails, a first cab signal lamp for displaying a proceed indication, electronic means for energizing said lamp by current delivered by said amplifier when alternating current is supplied to the track rails, a second cab signal lamp for displaying a restrictive indication, a circuit for energizing said second lamp comprising a permanent connection to a local source of direct current, said circuit including a resistor, and electronic means responsive to amplified alternating current derived from the track rails to supply direct current to said resistor in such a direction to block the flow of current in the portion of the circuit including said second lamp as long as said first lamp is energized.

5. In a railway cab signal system, train carried apparatus comprising an electronic amplifier having an input circuit responsive to alternating current in the track rails and output circuits adapted to deliver amplified alternating current derived therefrom, a first cab signal lamp for displaying a proceed indication, a circuit for energizing said lamp by amplified alternating current supplied by said amplifier, a second cab signal lamp for displaying a restrictive indication, a circuit for energizing said second lamp by direct current supplied from a local source on the train, electronic means for deriving a direct current potential from said amplified alternating current, and means for impressing said direct current potential upon the circuit for said second lamp to prevent its energization as long as said first lamp is energized.

6. In a railway cab signaling system, an electronic amplifier responsive to alternating current in the track rails, a train control relay, a cab signal lamp for displaying a proceed indication, an energizing circuit for said lamp including a front contact of said relay, circuits controlled by said amplifier for energizing said relay, and means including an electron tube energized by said amplifier along with said relay for supplying current to said circuit to effect the energization of said lamp.

7. In a railway cab signaling system, an electronic amplifier responsive to alternating current in the track rails, a train control relay, two cab signals for displaying a proceed indication and a restrictive indication respectively, energizing circuits for said signals including front and back contacts respectively of said relay, circuits controlled by said amplifier for energizing said relay, auxiliary means associated with said cab signals for displaying a restrictive indication, an energizing circuit for said auxiliary means permanently connected to a local source of current on the train, and means comprising an electron tube energized by said amplifier along with said relay for impressing a potential upon the circuit for said auxiliary means in opposition to said local source of current to prevent the display of a restrictive indication thereby as long as said relay is energized.

DAVID C. BETTISON.